Oct. 11, 1932.  K. HERMAN  1,882,494
WINDOW CLEANER
Filed March 2, 1928    2 Sheets-Sheet 1

Karl Herman, Inventor

By Wm S. Hodges, Attorney

Oct. 11, 1932.    K. HERMAN    1,882,494
WINDOW CLEANER
Filed March 2, 1928    2 Sheets-Sheet 2

Inventor
Karl Herman
By Wm T. Hodges
Attorney

Patented Oct. 11, 1932

1,882,494

UNITED STATES PATENT OFFICE

KARL HERMAN, OF MORRISVILLE, PENNSYLVANIA

WINDOW CLEANER

Application filed March 2, 1928. Serial No. 258,700.

This invention is a device for use in preventing accumulations of rain, snow, ice, sleet, etc., upon windows of all kinds, and is an improvement upon the inventions disclosed and claimed in Letters Patent No. 1,653,176 granted December 20, 1927, and an application for patent filed September 20, 1927, Serial No. 220,759.

One of the objects of the invention is to provide means by which falling snow, rain, sleet, etc., are prevented from accumulating upon the surface of a glass window, windshield or similar structure, such means being designed to project minute streams of air across said surface with sufficient force and intensity to normally prevent said elements from coming to rest in the vicinity of the glass, or to immediately dislodge them if they do temporarily adhere to the glass. A further object is to provide a window constructed with a frame-like nozzle having perforations adjacent to one surface of the glass and means by which said nozzle may be conveniently connected with a source of fluid supply under pressure. A further object is to provide means whereby the window sashes or frames may be efficiently connected with a source of fluid under pressure in such manner that the opening and closing operations of the window are not in any way impeded by the air supply apparatus.

The invention will be hereinafter fully set forth and particularly pointed out in the claim.

In the accompanying drawings:—

Figures 1, 2:
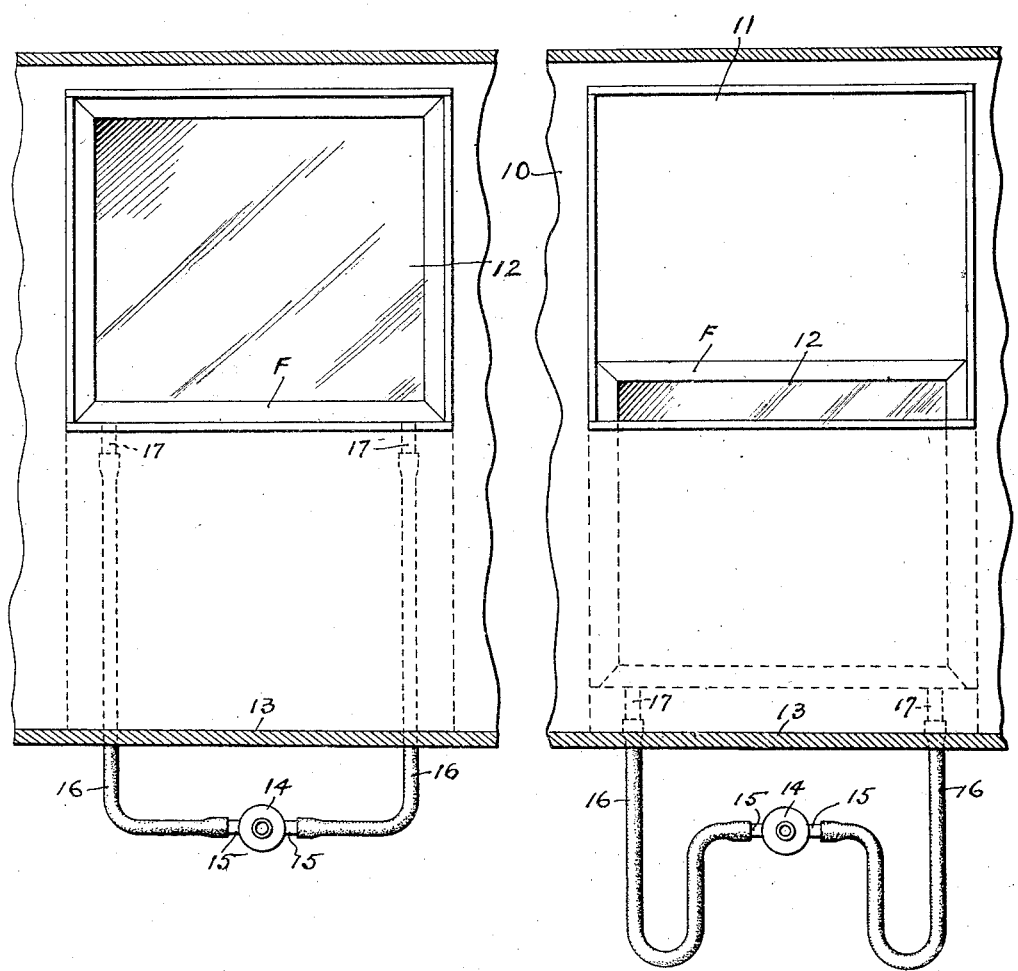
Figure 3:
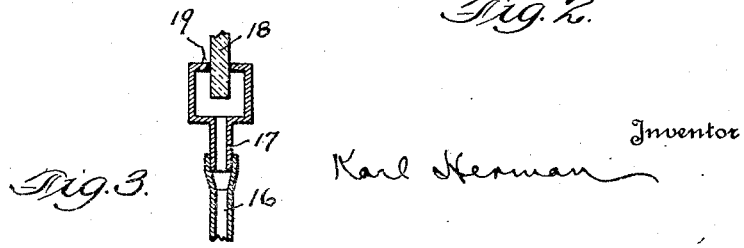
Figure 4:
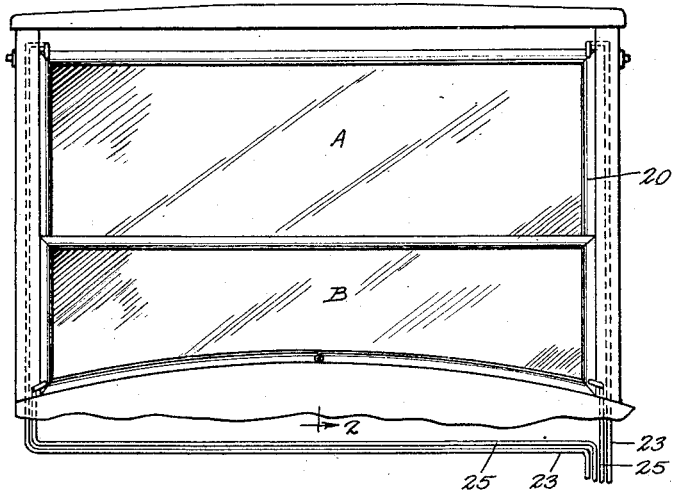
Figure 5:
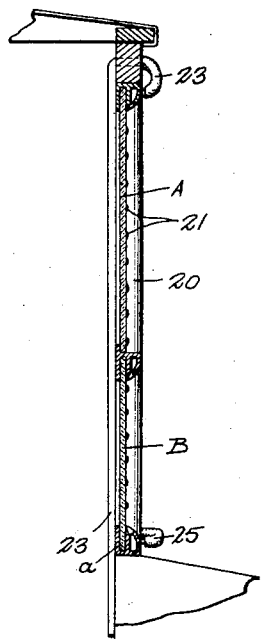
Figure 6:
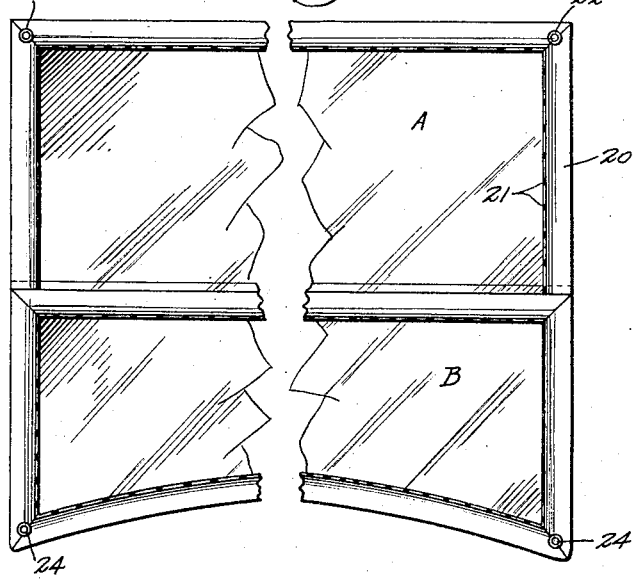
Figure 7:
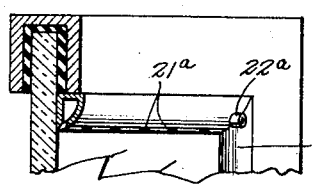

Figure 1 is a view, partly in section, illustrating the invention applied to a car window, the window being closed. Figure 2 is a similar view with the window open. Figure 3 is a detail sectional view of a portion of the window frame and the means for attaching the air supply devices. Figure 4 is a front elevation of the windshield of a motor vehicle, with the invention applied thereto. Figure 5 is a vertical sectional view on the line 2—2, Figure 4. Figure 6 is an enlarged detail view illustrating the arrangement of the nozzle-like frames on the windshield. Figure 7 is a detail view partly in section illustrating a slight modification.

Referring to the drawings, 10 diagrammatically illustrates a portion of a car body having its side provided with an opening 11, in which is slidably mounted the window 12. Located below the floor 13 is the air supply control valve 14, similar in construction and operation to the valve illustrated in the letters patent and the application for patent respectively, above identified. In view of the fact that the details of the apparatus for operating this valve are fully disclosed in both said patent and said application, it is deemed unnecessary to illustrate them in detail in this case.

Leading from the casing of valve 14 are two oppositely extended lateral nipples 15, which are connected by flexible supply pipes 16 with nipples 17 attached to the lower part of the frame F of the window sash. The top, bottom and sides of said frame are provided with longitudinally disposed slots connected with each other so as to receive the correspondingly positioned edges of the glass 18, and is of tubular cross section, being provided with perforations 19 which lie adjacent to and are inclined toward the outer face of the glass. It will be observed that the edge of the glass 16 extends well into the tubular frame, as illustrated in Figure 3, so that the outgoing air will be directed into the space between one surface of the glass and the adjacent wall of the tubular frame, so as to produce a nozzle-like chamber with which the perforations 19 communicate.

In operation, during stormy weather the valve 14 is operated to permit fluid, preferably air under pressure from a suitable source (not shown) to enter the conduits 16, so as to be delivered to the tubular frame F, from which it is discharged through the perforations 19 along the outer surface of the glass. It will be understood that the force of delivery of the air, which is in four directions, is such that any rain, snow, sleet, and the like which reaches the vicinity of the window, is kept in constant motion so that it will in a great measure be prevented from contacting with the glass, and in the event that they should contact with the glass, the force of the fluid discharge is sufficient to immediately dislodge it. By this means, the front surface of the glass is thoroughly scoured and kept clean, so that vision therethrough is in no way impeded.

It will be observed that the valve 14 is preferably located below the floor 13 and the tubes 16 are located on both sides thereof in such position that when the window is lowered, as illustrated in Figure 2, said tubular conduits will assume the form of depending loops, located on opposite sides of the valve 14, in such manner that no strain is brought upon the conduits, and free raising and lowering of the window sash is in no way impeded.

In the form illustrated in Figures 4 to 7 both inclusive, the invention is shown as applied to a motor vehicle windshield. Referring to said figures, A and B are the upper and lower panels respectively, of a standard type windshield, the plate glass elements thereof having their edges mounted between flanges a and tubular frame member 20 integral therewith. It will be noted that the panel A is provided with tubular frame-like nozzle portions extending across the top and down the sides but not at the bottom thereof and the panel B is provided with a tubular frame or nozzle extending around all four edges. It is to be understood that these tubular frame-like nozzles are preferably constructed of metal and that they are provided with perforations 21 which are so positioned as to lie adjacent to the front face of the glass members, so that streams of air ejected through said perforations will impinge against said glass.

The corners of the frame-like nozzle of the panel A are provided with nipples 22 to which are connected air conduits 23. In a similar manner, the lower corners of the frame-like nozzle which surrounds the panel B are provided with nipples 24 which are connected with conduits 25. The conduits 23 and 25 are connected with an air control valve (not shown) similar to the valve 14 heretofore described. It will be noted from Figure 2 that the conduits 23 and 25 are arranged along the rear of the windshield at the ends thereof and are extended through suitable openings so that their extremities may be connected with the nipples 22 and 24 respectively, which, as shown, project forwardly from the windshield sections. The arrangement is such that the sections A and B may be readily adjusted with respect to each other as is necessary in the operation of windshields, the conduits being so connected as not to interfere with this operation.

In Figure 7, in lieu of making the tubular nozzle a part of the windshield frame, a supplemental frame is employed consisting of the tubular sections 20a which are perforated at 21a and provided with nozzles 22a by means of which the conduits may be connected therewith.

It is to be understood that the air to be supplied through the valve 14 may be received from any suitable source. It may be preheated in any suitable manner if desired, or if desired it may be heated in the manner disclosed in the application for patent Serial No. 220,759 above referred to. It is also to be understood that although the invention has been specifically illustrated and described, as applied to car windows and windshields respectively, the invention is not limited thereto, but may be applied to any other form of window without departing from the spirit thereof. The advantages of the invention will be readily understood by those skilled in the art to which it belongs. For instance, it will be particularly observed that streams of heated or cold air, as desired, may be projected across the front surface of the glass with such force that particles of rain, snow, sleet, etc. falling in front of the glass will be kept in constant motion so that they will not coat the glass. And in the event that any particles should come to rest in contact with the glass, they will be quickly dislodged so as to maintain a clarified condition at all times. Of course, by raising the temperature of the air, either by means illustrated in my pending application or in any other desired manner or from any other suitable source, any tendency of the elements to freeze upon the glass is prevented. It is also to be understood that many changes in details of construction and design may be made when necessary without departing from the spirit of the invention, and therefore the right is reserved to make all necessary improvements, alterations or changes in structure and design within the scope of the appended claim.

Having thus explained the nature of the invention and described an operative manner of constructing and using the same, although without attempting to set forth all of the forms in which it may be made, or all of the forms of its use, what is claimed is:—

The combination with a window frame having its top, bottom and sides formed of communicating tubes provided with perforations, said parts being also provided with longitudinal slots communicating with each other, and also having nipples communicating with the interiors of said tubes, and a glass having its edges extended through said slots into said tubes a substantial distance, so that outgoing air will be directed into the space between the surface of the glass and an adjacent wall of the tube, said perforations being inclined in a direction leading toward the surface of the glass with the outlets thereof close to said surface, and means for introducing air under pressure into said tubes.

In testimony whereof I have hereunto set my hand.

KARL HERMAN.